Jan. 11, 1955   J. A. CUPLER II   2,699,049
PORTABLE TOOL
Filed Dec. 7, 1950
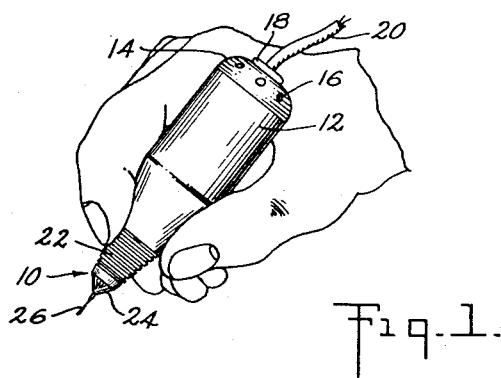
Fig. 1.
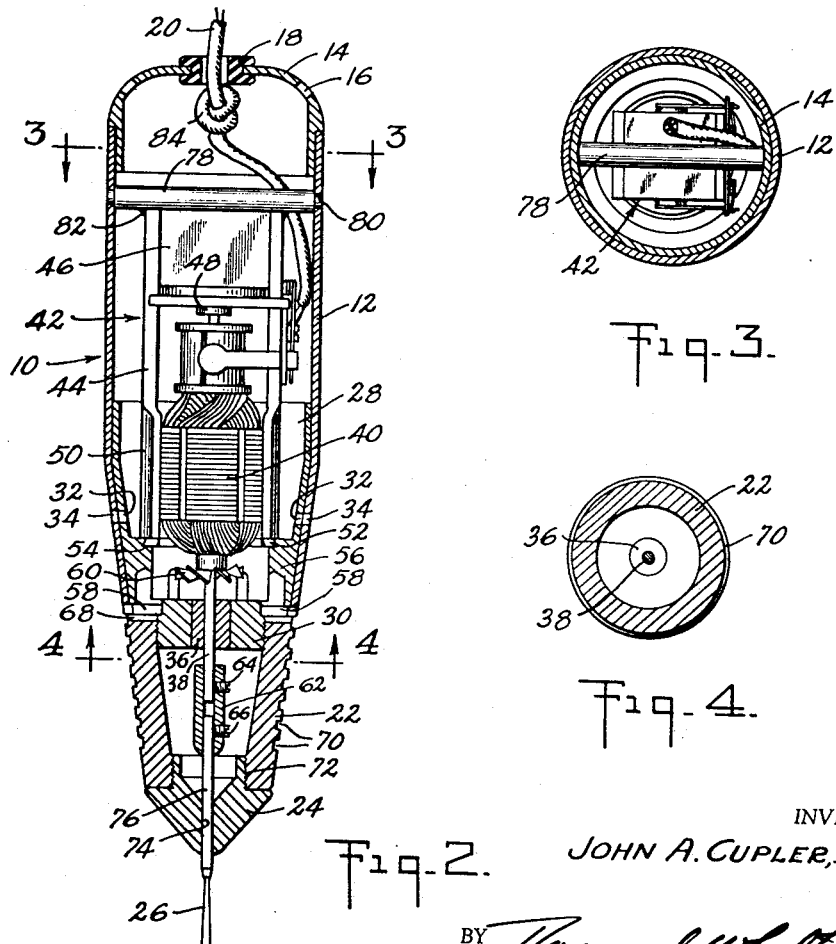
Fig. 3.
Fig. 4.
Fig. 2.
INVENTOR
JOHN A. CUPLER, II
BY
ATTORNEY

United States Patent Office 2,699,049
Patented Jan. 11, 1955

2,699,049

PORTABLE TOOL

John A. Cupler II, Cumberland, Md.

Application December 7, 1950, Serial No. 199,653

2 Claims. (Cl. 64—4)

This invention relates to a portable tool adapted for use in drilling, grinding, routing, engraving, and various other operations which are capable of being performed with hand drills already on the market.

In the cases of all such tools available prior to this time, their weight has been excessive, their balance has been unsuitable for many purposes, and the tools driven thereby have been subject to unintended movements to an undesirable degree.

It is among the objects of the present invention to overcome many of these disadvantages common among the prior art devices of this category, providing a tool which is so light in weight and carefully balanced that it can be used in much the manner of a pencil and by providing a bearing for the shank of the cutting tool, such as the drill, grinding wheel, burr, or the like, beyond the bearing or bearings supporting the driving shaft so that the cutting tool will be supported against undesirable movements at a point beyond that at which it is attached to its driving shaft or socket.

The portable tool of the present invention comprises a housing, a plurality of bearings carried by the housing in substantially constant mutually spaced coaxial relationship, a driving shaft supported by the housing in certain of the bearings and terminating intermediate a pair of the bearings, and a tool holder carried by the shaft for connection with a tool shank. A preferred form of the invention involves the use of three bearings satisfying these requirements, the driving shaft being supported in a pair of the bearings and terminating intermediate another pair. The housing is preferably defined by separate members, one of which supports the driving shaft and another of which supports one of the bearings for the tool shank.

The driving shaft is preferably of the rotary type, for which a rotary driving means is provided, in the preferred form, assuming the form of a motor received within the housing. In order to connect the driving shaft with a tool shank, a tool holder is secured to the shaft intermediate one of its bearings and the tool shank bearing. Whereas the tool shank bearing has an operative position at a fixed distance from the shaft bearings, it may be removably secured in position, as by screw threads, for example, and more specifically, by left threads to assure its tendency to retain its fixed relationship to the other bearings during operation of the tool.

The housing preferably has a convergent end adjacent to which the tool shank bearing is secured, facilitating manipulation of the tool. The tool shank bearing is relatively harder than the shaft bearings, since it is preferable that the expendable tools engaging the tool shank bearing receive at least a portion of the wear, since after a reasonable length of time, they are always replaced. The motor frame in the housing supporting one of the shaft bearings is preferably secured to the housing by means of a member extending transversely of the housing and removably secured thereto.

A commercially practical portable tool embodying this invention comprises a housing, a motor support received in the housing, a shaft bearing secured in the support, a motor frame mounted in the support and housing providing a bearing coaxial with the shaft bearing, a motor shaft supported in the bearings extending beyond the shaft bearing, a tapered hand piece detachably secured to the support, a tool holder carried by the shaft, and a tool shank bearing secured to the hand piece in alignment with the coaxial bearings.

A more complete understanding of the invention will follow from a detailed description of the attached drawings wherein:

Fig. 1 is an elevation depicting the manner in which the portable tool is manipulated by the operator;

Fig. 2 is a sectional elevation of the tool;

Fig. 3 is a transverse section taken along line 3—3 of Fig. 2; and

Fig. 4 is a transverse section taken along line 4—4 of Fig. 2.

The tool 10 depicted in Fig. 1 includes a main housing member 12 closed at its upper end by means of a cap 14 containing ventilating openings 16 and an opening defined by a bushing 18 penetrated by insulated conductors 20. The lower portion of the main housing member converges towards its lower end where a similarly convergent hand piece 22 is attached, the hand piece in turn receiving a tool shank bearing member 24 whose bearing is penetrated by a tool, depicted as a drill 26 in Fig. 1.

As depicted in Fig. 2, the main housing member 12 assumes the form of a convergent tube whose lower internal wall nestingly receives a motor frame support member 28 having a convergent lower end terminating in a threaded extension 30. This motor frame support member has openings 32 penetrating a convergent portion of its wall for registry with similar openings 34 penetrating the wall of the main housing member, for use in assembly and disassembly of the device. Centrally of the depending threaded end 30 of the frame support member, a driving shaft bearing 36 is frictionally secured for the penetration of a motor driving shaft 38 secured to the rotor 40 of the motor 42 whose frame 44 supports a permanent magnet 46 and a bearing 48 which receives the upper end of the shaft 38 as viewed in Fig. 2. As will be apparent from the drawings, the pole pieces 50 of the motor frame terminate in slightly divergent keying members 52 which are biased outwardly by the resilience of the frame into a complemental tapered groove 54 provided in an enlarged portion 56 of the motor frame support member 28. A number of openings 58 are formed about the depending threaded end 30 of the motor frame support opening radially to permit the passage of air therethrough in cooperation with the ventilating openings 16 carried by the cap 14, the flow of air being induced by a fan 60 carried by the motor shaft 38.

The portion of the motor shaft 38 projecting below the bearing 36 receives a tool holder or chuck 62 secured thereto by a set screw 64, the other end of the tool holder receiving the shank of a tool 26 to which it is secured by means of a set screw 66. The hand piece 22 is secured to the housing and the motor frame support by its threads which cooperate with those carried by the threaded end 30 of the motor frame support. The tapered configuration of the hand piece constitutes a continuation of the taper at the lower end of the housing rendering the tool very convenient to handle, in much the manner of a pencil or pen. The upper end of the hand piece is provided with transverse slots 68 to permit the passage of ventilating air propelled by the fan 60. External annular grooves 70 produce an improved gripping surface on the hand piece, but various patterns or types of roughening may be substituted.

The lower end of the hand piece 22 is provided with internal left hand threads 72 for the reception of a similarly threaded tool shank bearing member 24 whose hardened bearing surface 74 nicely fits the shank 76 of the tool 26 to prevent undesirable lateral movement of the tool regardless of eccentricities and tolerances which may occur in the chuck, motor, or other bearings. Accordingly, with this apparatus, the only limitation on accuracy will be that to which the cutting tool shank itself is subject.

To assemble the device constituting the subject matter of this invention, the shaft bearing 36 will be pressed into place, the motor frame support member 28 will be forced into the main housing member 12 until the assembly openings 32 and 34 register, the motor assembly including the frame and rotor will be introduced with the lower end of the motor shaft penetrating the bearing 36, a suitable assembly tool will be inserted through the openings 32 and 34 to urge the pole pieces of the motor towards one another until they can be released in keying relationship with the tapered counterbore of the motor support member 28 which receives them, and the tool holder 62 and an assembly tool corresponding to the cutting tool 26 will be secured to the shaft 38 and the hand piece 22 and tool shank bearing member 24 will be screwed into place. At this point, the upper end of the main housing member 12 will be deformed sufficiently to permit the transverse pin 78 to be snapped into the openings 80 formed in the wall of the housing member 12. The reduced ends of the pin will locate it with respect to the housing for purposes of disassembly and reassembly should it be necessary to remove the motor for servicing. After the transverse pin 78 has been thus located, the motor frame 44 will be adjusted with respect thereto until the three bearings are in alignment and the motor shaft will rotate freely. When these conditions have been achieved, the motor frame will be secured to the transverse pin 78 such as by solder 82 or otherwise to produce a more or less permanent association.

Prior to the time that the motor assembly was inserted in the housing, the conductors 20 were attached to the motor terminals, a knot 84 tied in the conductors, and the opposite end threaded through the insulating bushing or grommet 18 supported in the cap 14. Then, after these other assembly operations have been completed, the cap 14 is pressed into the housing member 12. To remove the motor assembly from the housing, it is necessary only that the cap 14 be removed, the upper end of the housing member 12 slightly deformed to permit extraction of the transverse pin 78, whereupon this pin and the entire motor assembly can be extracted, assuming of course, that the tool holder 62 has first been removed from the lower end of the shaft 38.

Thus it will be seen, that with such an arrangement, cutting tools which are concentric with their shanks and whose shanks nicely fit the bearing provided by the tool shank bearing member 24 can produce very accurate work even in the micro-drill sizes. The portable tool of the present invention can be adapted to various sized shanks by the substitution of different tool holders 62 and corresponding tool shank bearing supports 24.

Since variations of this invention will suggest themselves to those skilled in the art just as they have occurred to the present inventor, this invention should not be limited to the single embodiment described beyond the scope of the appended claims.

I claim:
1. A portable cutting tool comprising a housing, a pair of bearings intermediately carried by said housing and a third bearing having a hard bearing surface threadedly attached to an end of said housing in substantially constant mutually spaced coaxial relationship, a driving shaft supported by said pair of said bearings and terminating short of said third bearing for connection with a tool shank and, a chuck carried by said driving shaft intermediate two of said bearings, said housing having a separable joint adjacent said chuck providing radial access thereto.

2. A portable tool comprising a housing, a shaft bearing secured in said housing, a motor frame in said housing supporting a bearing coaxial with said shaft bearing, a member extending transversely of said housing securing said frame thereto, a motor shaft supported in said bearings extending beyond said shaft bearing normally rotating in a left hand direction, a chuck carried by said shaft, and a tool shank bearing secured to said housing by a left hand thread beyond said chuck, whereby normal rotation of said shaft tends to retain said shank bearing relative to said housing, said housing including a separable joint adjacent said chuck for access thereto.

References Cited in the file of this patent

UNITED STATES PATENTS

| | | |
|---|---|---|
| 1,831,813 | Levedahl | Nov. 17, 1931 |
| 1,833,967 | Groff | Dec. 1, 1931 |
| 2,170,036 | Schumann | Aug. 22, 1939 |
| 2,237,999 | Newman | Apr. 8, 1941 |
| 2,241,464 | Koch | May 13, 1941 |
| 2,346,778 | Mitchell | Apr. 18, 1944 |

FOREIGN PATENTS

| | | |
|---|---|---|
| 428,839 | Great Britain | May 20, 1935 |